United States Patent
Wang et al.

(10) Patent No.: US 7,746,288 B2
(45) Date of Patent: Jun. 29, 2010

(54) ANTENNA FOR WWAN AND INTEGRATED ANTENNA FOR WWAN, GPS AND WLAN

(75) Inventors: Chi-Yueh Wang, Kaohsiung (TW);
Cheng-Han Lee, Kaohsiung (TW);
Ching-Chia Mai, Kaohsiung (TW)

(73) Assignee: Yageo Corporation, Kaohsiung (TW)

( * ) Notice: Subject to any disclaimer, the term of this patent is extended or adjusted under 35 U.S.C. 154(b) by 1050 days.

(21) Appl. No.: 11/437,686

(22) Filed: May 22, 2006

(65) Prior Publication Data

US 2007/0200774 A1 Aug. 30, 2007

(30) Foreign Application Priority Data

Feb. 24, 2006 (TW) ................ 95106360 A

(51) Int. Cl.
*H01Q 1/24* (2006.01)
(52) U.S. Cl. ...................... 343/846; 343/702
(58) Field of Classification Search .......... 343/700 MS, 343/702, 846
See application file for complete search history.

(56) References Cited

U.S. PATENT DOCUMENTS

| 6,339,400 | B1 | 1/2002 | Flint et al. |
| 6,876,329 | B2 * | 4/2005 | Milosavljevic ....... 343/700 MS |
| 6,982,675 | B2 | 1/2006 | Kwak et al. |
| 2004/0014474 | A1 | 1/2004 | Kanada |

FOREIGN PATENT DOCUMENTS

| JP | 59078707 | 5/1984 |
| JP | 2002-050924 | 2/2002 |
| JP | 2003-008342 | 2/2003 |
| JP | 2004023768 A | 1/2004 |
| JP | 2004-064282 | 2/2004 |
| JP | 2004-228640 | 8/2004 |
| TW | 542416 | 7/2003 |
| TW | 227576 B1 | 2/2005 |
| TW | 257522 | 2/2005 |
| TW | 229473 B | 3/2005 |

OTHER PUBLICATIONS

Apr. 1, 2008 Office Action for Corresponding Japanese Patent Application No. 2006-143018.
Feb. 24, 2009 Notice of Allowance for Corresponding Japanese Patent Application No. 2006-143018.
Dec. 17, 2008 Office Action for corresponding Taiwan, R.O.C. Patent Application No. 095106360.

* cited by examiner

*Primary Examiner*—Michael C Wimer
(74) *Attorney, Agent, or Firm*—Volentine & Whitt, PLLC

(57) ABSTRACT

The present invention relates to an antenna for WWAN and an integrated antenna for WWAN, WLAN, and GPS. The integrated antenna comprises a ground metal plate, a coupled WWAN antenna, a WLAN antenna, an auxiliary grounding element, and at least one supporting element. The integrated antenna of the invention can be applied to a wireless electronic device with WWAN and WLAN by utilizing the coupled WWAN antenna to induce a WWAN frequency and the WLAN antenna to induce a WLAN frequency. In addition, the ground metal plate and the auxiliary grounding element are selectively connected or not connected to a ground end of the wireless electronic device, and can be separately used to provide grounding effect. Therefore, the integrated antenna can be mounted on any part of the wireless electronic device, and can have stable electrical characteristic.

35 Claims, 10 Drawing Sheets

ANTENNA FOR WWAN AND INTEGRATED ANTENNA FOR WWAN, GPS AND WLAN

BACKGROUND OF THE INVENTION

1. Field of the Invention

The present invention relates to an antenna for wireless networks. More particularly, the present invention relates to an antenna for WWAN or an integrated antenna for WWAN and WLAN.

2. Description of the Related Art

With the rapid development of wireless communication technology, various multi-frequency communication products appear constantly. Therefore, wireless communication products have gradually become a part of daily life. Almost all the new products have been provided with the wireless transmission function to satisfy people's requirements. Notebook computers often perform data transmission. Since wireless transmission has the advantage of simplifying troubles in wiring and setting, the arrangement of antennas is required to achieve wireless transmission. However, the wide acceptance of notebook computers with the function of wireless transmission relies much on the appearance, size, and performance of the products, which are all very important points. Thus, the favorable design of antennas and suitable positions for their placement are especially important.

A conventional antenna arrangement for notebook computers, for example, is disclosed in U.S. Pat. No. 6,339,400B1, in which one or more antennas 11, 12 are disposed around a screen 10 of a notebook computer 1, as shown in FIG. 1. However, since the ground ends of the antennas 11, 12 must be connected to the ground of the screen or the frame of the screen, the conventional design of antenna arrangement has a limitation in the installation site, i.e. the installation site cannot be flexibly adjusted. Moreover, the antennas 11, 12 can only be applicable to WLAN.

Therefore, it is necessary to provide an antenna suitable for WWAN or suitable for both WWAN and WLAN in order to solve the above problem.

SUMMARY OF THE INVENTION

An objective of the present invention is to provide an integrated antenna for WWAN and WLAN. The integrated antenna comprises a ground metal plate, a coupled WWAN antenna, a WLAN antenna, an auxiliary grounding element, and at least one supporting element. The coupled WWAN antenna comprises a first radiating metal plate, a second radiating metal plate, and a third radiating metal plate. The first radiating metal plate is a separate metal plate. The first radiating metal plate is used to match with the second radiating metal plate to induce a first resonance mode. The third radiating metal plate is used to induce a second resonance mode. The WLAN antenna is connected to the ground metal plate. The WLAN antenna comprises a fourth radiating metal plate and a fifth radiating metal plate, so as to respectively induce a third resonance mode and a fourth resonance mode. The auxiliary grounding element is electrically connected to the ground metal plate. The supporting element is used to support the first radiating metal plate.

The integrated antenna can be applied to a wireless electronic device with WWAN and WLAN by utilizing the coupled WWAN antenna to induce a WWAN frequency and the WLAN antenna to induce a WLAN frequency.

Another object of the present invention is to provide an antenna for WWAN. The antenna comprises a ground metal plate, a coupled WWAN antenna, an auxiliary grounding element, and at least one supporting element. The coupled WWAN antenna comprises a first radiating metal plate, a second radiating metal plate, and a third radiating metal plate. The first radiating metal plate is a separate metal plate. The first radiating metal plate is used to match with the second radiating metal plate to induce a first resonance mode. The third radiating metal plate is used to induce a second resonance mode. The auxiliary grounding element is electrically connected to the ground metal plate. The supporting element is used to support the first radiating metal plate.

The antenna can be applied to a wireless electronic device with WWAN by utilizing the coupled WWAN antenna to induce a WWAN frequency.

The integrated antenna of the present invention is disposed in the wireless electronic device. The ground metal plate of the antenna can be used to provide a grounding effect separately, and is selectively to connected or not connected to a ground end of the wireless electronic device. Therefore, the integrated antenna of the present invention can be mounted on any part of the wireless electronic device, and also has stable electrical characteristics.

The integrated antenna of the present invention utilizes an auxiliary grounding element that can be bent and folded, thus saving space to satisfy the requirements of customers and providing preferred grounding effects and radiation effects. The integrated antenna of the present invention further has a gain metal plate for increasing gain.

DETAILED DESCRIPTION OF THE INVENTION

Figure 1:
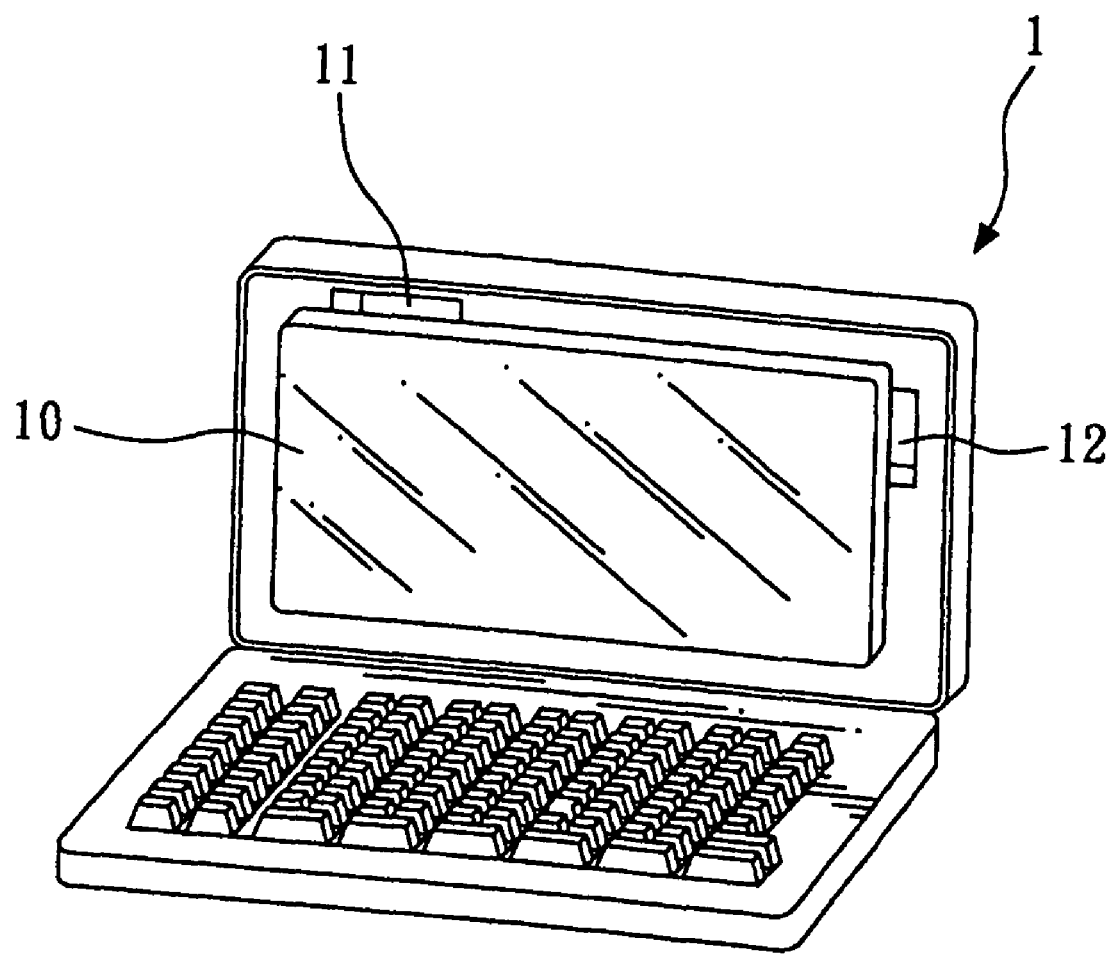
FIG. 1 is a schematic view of the conventional antenna disposed around the screen of a notebook computer.
Figure 2A:
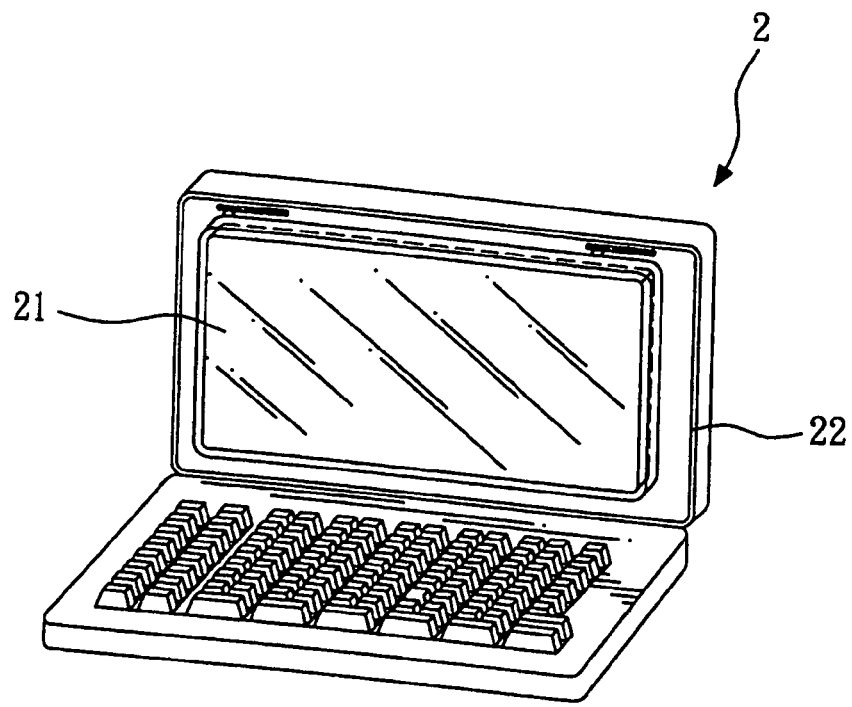
FIG. 2A is a schematic view of the antenna disposed in the screen frame of a notebook computer according to the present invention.
Figure 2B:
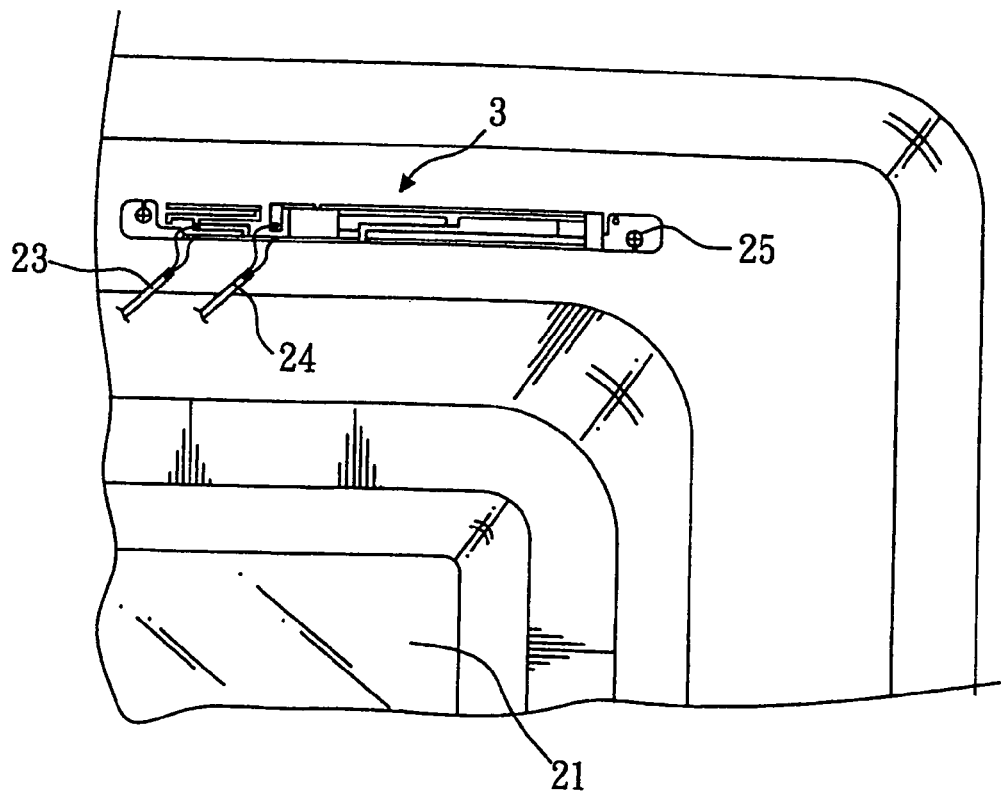
FIG. 2B is a partially enlarged view for showing the antenna of the present invention disposed in the screen frame of the notebook computer.

Referring to FIGS. 2A and 2B, the arrangement structure of an integrated antenna applied to a notebook computer 2 according to the present invention is shown. The present invention can be used in various wireless electronic devices including, but not limited to, notebook computers. All the common electronic products such as personal digital assistant (PDA) can utilize the integrated antenna of the present invention to achieve the wireless communication. The notebook computer 2 has a screen 21 and a screen frame 22. The integrated antenna 3 of the present invention is disposed in the screen frame 22 of the notebook computer 2, and is connected to the control circuit of the notebook computer 2 by two coaxial wires 23 and 24, so as to transmit data through the integrated antenna 3.

The integrated antenna 3 has at least one fixing portion for fixing the integrated antenna 3 to the screen frame 22. In this embodiment, the fixing portion is two through-holes 35 (as shown in FIG. 3) for two screws 25 to fix the integrated antenna 3 to the screen frame 22 of the notebook computer 2 (as shown in FIG. 2B).

Figure 3:
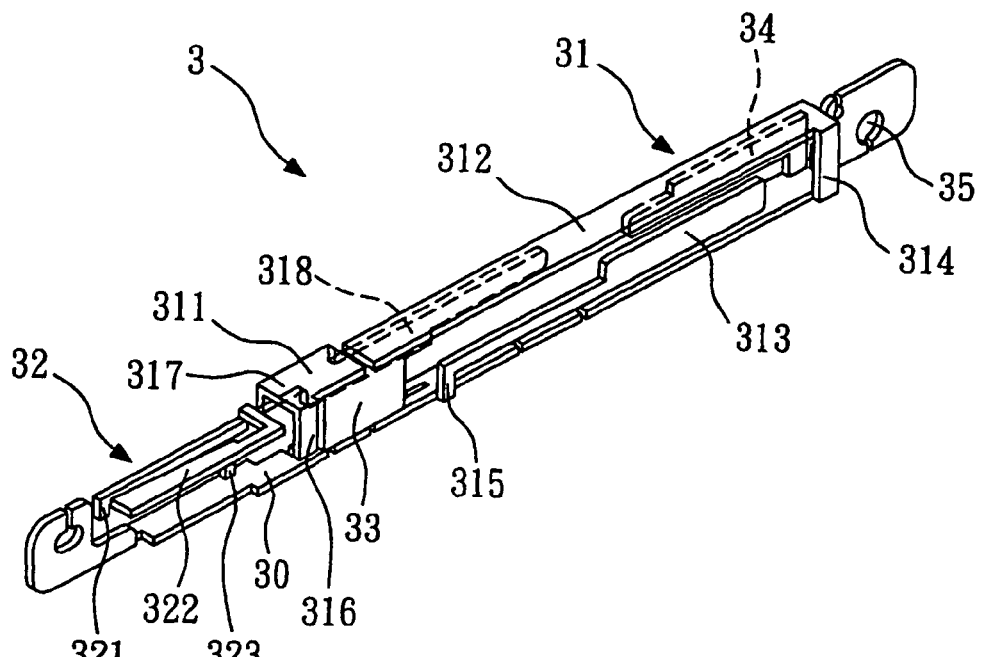
FIG. 3 is a stereogram of the integrated antenna according to the first embodiment of the present invention.
Figure 4:
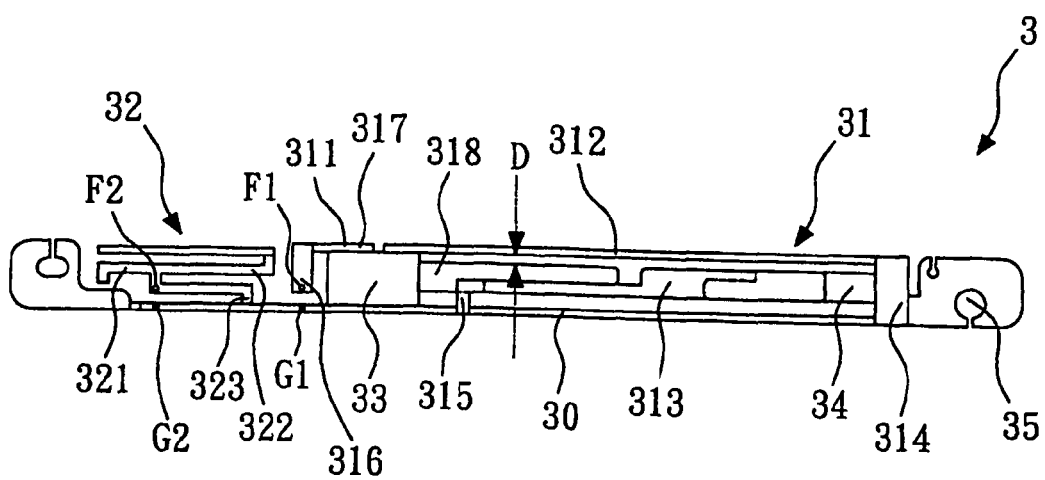
FIG. 4 is a front view of the integrated antenna according to the first embodiment of the present invention.
Figure 6:
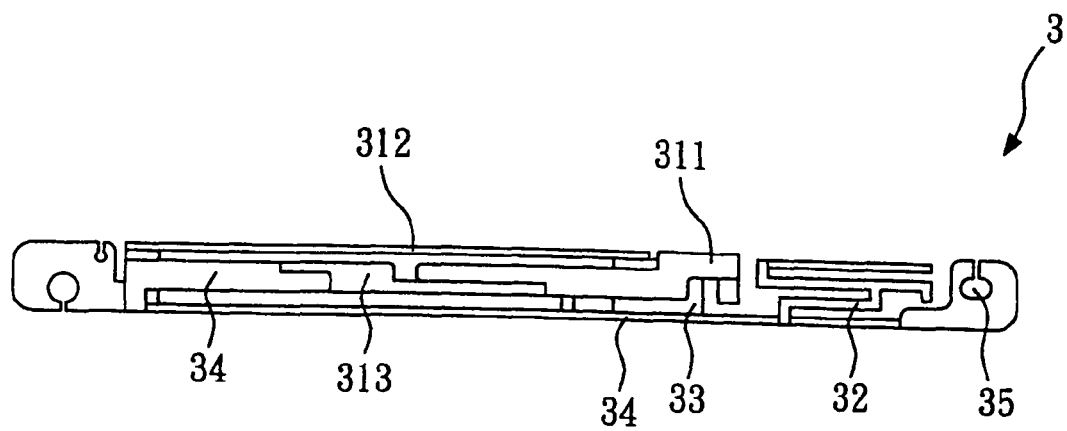
FIG. 6 is a back view of the integrated antenna according to the first embodiment of the present invention.

Referring to FIGS. 3, 4, and 6, schematic views of the integrated antenna 3 for WWAN and WLAN according to the first embodiment of the present invention are shown. Referring to FIGS. 3 and 4, the integrated antenna 3 comprises a ground metal plate 30, a coupled WWAN antenna 31, and a WLAN antenna 32. The coupled WWAN antenna 31 comprises a first radiating metal plate 311, a second radiating metal plate 312, and a third radiating metal plate 313. The first radiating metal plate 311 is a separate metal plate which is not connected to another metal plate and the ground metal plate 30. In this embodiment, the first radiating metal plate 311 is disposed at a predetermined position by a supporting element 33, and the supporting element 33 is an insulating element. In other applications, the first radiating metal plate 311 can also be disposed at the predetermined position by a plurality of supporting elements. The first radiating metal plate 311 is used to match with the second radiating metal plate 312 to induce a first resonance mode. The third radiating metal plate 313 is used to induce a second resonance mode. The frequency of the first resonance mode is in a range of 824 MHz to 960 MHz, and the frequency of the second resonance mode is in a range of 1575 MHz and 1710 MHz to 2170 MHz, wherein the frequency of 1575 MHz of the second resonance mode is applied to the Global Position System (GPS).

A distance D between the first radiating metal plate 311 and the second radiating metal plate 312 when inducing the first resonance mode is between 0.5 mm and 1.5 mm. When the distance D between the first radiating metal plate 311 and the second radiating metal plate 312 is between 0.5 mm and 1.0 mm, the induced frequency of the first resonance mode is in a range of 824 MHz to 894 MHz. When the distance D between the first radiating metal plate 311 and the second radiating metal plate 312 is between 1.0 mm and 1.5 mm, the induced frequency of the first resonance mode is in a range of 880 MHz to 960 MHz. The above-mentioned distance D can be determined in practice.

Therefore, referring to FIG. 2A, in practice, two integrated antennas are respectively disposed in the notebook computer 2, in which the frequency of the first resonance mode of one integrated antenna is in a range of 824 MHz to 894 MHz (D=0.5~1.0 mm), and the frequency of the first resonance mode of the other integrated antenna is in a range of 880 MHz to 960 MHz (D=1.0~1.5 mm).

The coupled WWAN antenna 31 further comprises a first connecting metal plate 314 and a second connecting metal plate 315 for respectively connecting the second radiating metal plate 312 and the third radiating metal plate 313 to the ground metal plate 30.

The WLAN antenna 32 is connected to the ground metal plate 30. The WLAN antenna 32 comprises a fourth radiating metal plate 321 and a fifth radiating metal plate 322 for respectively inducing a third resonance mode and a fourth resonance mode. The length of the fourth radiating metal plate 321 is less than that of the fifth radiating metal plate 322, so the frequency of the third resonance mode is higher than that of the fourth resonance mode. In this embodiment, the frequency of the third resonance mode is 5 GHz, and the frequency of the fourth resonance mode is 2.4 GHz.

Referring to FIGS. 4 and 6, the WLAN antenna 32 further comprises a third connecting metal plate 323 for connecting the fourth radiating metal plate 321 and the fifth radiating metal plate 322 to the ground metal plate 30. The fourth radiating metal plate 321 and the fifth radiating metal plate 322 extend in opposite directions, and are disposed approximately parallel with the ground metal plate 30 and separated for a distance, such that the WLAN antenna 32 is formed as an T shape. In addition, the integrated antenna 3 further comprises a gain metal plate 34 connected to the ground metal plate 30 for increasing the gain.

Therefore, the integrated antenna 3 of the present invention can be used in the frequency of WWAN (for example, in a range of 824 MHz to 960 MHz, in a range of 1575 MHz (the frequency of GPS) and 1710 MHz to 2170 MHz) and the frequency of WLAN (2.4 GHz or 5 GHz) at the same time.

Referring to FIGS. 3, 4, and 6 again, in the integrated antenna 3, the ground metal plate 30 is disposed on a bottom surface. The first connecting metal plate 314 and the second connecting metal plate 315 of the coupled WWAN antenna 31 extend from one side of the ground metal plate 30 and are disposed on a first side surface. The first radiating metal plate 311 of the coupled WWAN antenna 31 comprises a first portion 316, a second portion 317, and a third portion 318. The first portion 316 is disposed on the first side surface, and the second portion 317 is disposed on a top surface corresponding to the bottom surface. The third portion 318 is disposed on a second side surface corresponding to the first side surface. The second radiating metal plate 312 is disposed on the top surface. The third radiating metal plate 313 is disposed on the first side surface. The WLAN antenna 32 is disposed on the second side surface and the top surface, i.e., the third connecting metal plate 323 and the fourth radiating metal plate 321 are disposed on the second side surface, and the fifth radiating metal plate 322 extends from the second side surface to the top surface. The gain metal plate 34 is connected to the ground metal plate 30 and is disposed on the second side surface as the WLAN antenna 32. Therefore, the integrated antenna 3 is formed as approximately a shape of hollow cuboid with air as the medium.

Further, referring to FIGS. 2B and 4, the first portion 316 of the first radiating metal plate 311 has a first feed point F1 thereon, and the ground metal plate 30 has a first ground point G1 under the position relative to the first feed point F1. The first feed point F1 and the first ground point G1 are electrically connected to the coaxial wire 24. The joint between the third connecting metal plate 323 and the fourth radiating metal plate 321 and the fifth radiating metal plate 322 has a second feed point F2. The ground metal plate 30 has a second ground endpoint G2 under the position relative to the second feed point F2. The second feed point F2 and the second ground endpoint G2 are electrically connected to the coaxial wire 23. The coaxial wires 23 and 24 connect the integrated antenna 3 to the control circuit of the notebook computer 2 to receive wireless signals through the first feed point F1 and the second feed point F2 and transmit the signals to the control circuit of the notebook computer 2.

Figure 5:
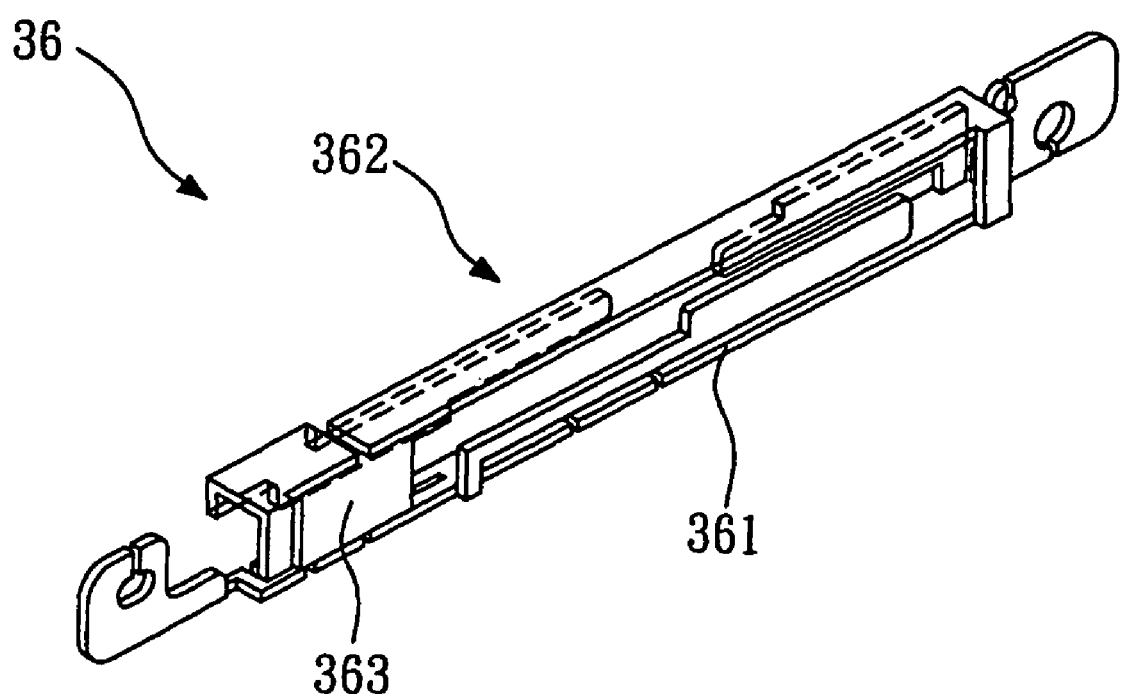
FIG. 5 is an antenna for WWAN of the present invention.

The integrated antenna 3 for WWAN and WLAN in the first embodiment of the present invention can only be used in WWAN by deleting the WLAN antenna, thus becoming an antenna 36 for WWAN, as shown in FIG. 5. The antenna 36 comprises a ground metal plate 361, a coupled WWAN antenna 362, and a supporting element 363, which have the same structure and arrangement as the above-mentioned ground metal plate 30, the coupled WWAN antenna 31, and the supporting element 33 of the integrated antenna 3 in the first embodiment of FIG. 3, and the details will not be described herein again.

Figure 7:
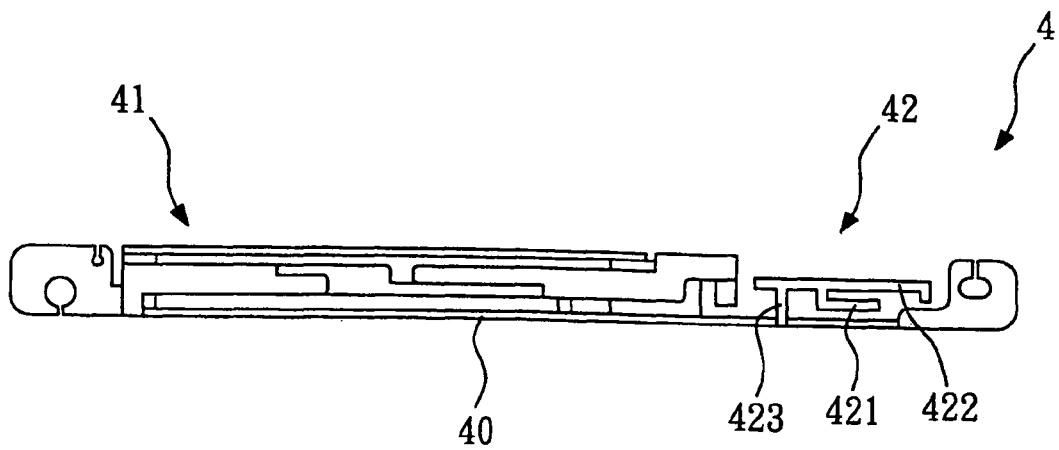
FIG. 7 is a back view of the integrated antenna according to the second embodiment of the present invention.

Referring to FIG. 7, a schematic view of the integrated antenna 4 for WWAN and WLAN according to the second embodiment of the present invention is shown. The integrated antenna 4 comprises a ground metal plate 40, a coupled WWAN antenna 41, and a WLAN antenna 42. Unlike the integrated antenna 3 of the first embodiment, the WLAN antenna 42 of the second embodiment is not formed as an T shape. The third connecting metal plate 423 of the WLAN antenna 42 connects the fourth radiating metal plate 421 and the fifth radiating metal plate 422 to the ground metal plate 40. In addition, the fourth radiating metal plate 421 and the fifth radiating metal plate 422 extend in the same direction, and the fourth radiating metal plate 421 and the fifth radiating metal plate 422 are disposed in approximately parallel with the ground metal plate 40 and separated for a distance, so as to make the WLAN antenna 42 is formed as an F shape.

Figure 8:
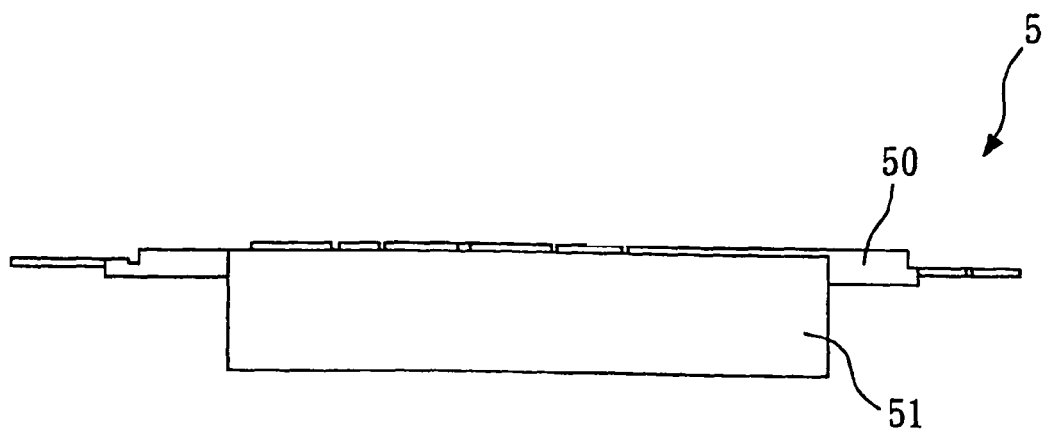
FIG. 8 is a schematic view of the integrated antenna according to the third embodiment of the present invention.

Referring to FIG. 8, a schematic view of the integrated antenna 5 for WWAN and WLAN according to the third embodiment of the present invention is shown. The integrated antenna 5 further comprises an auxiliary grounding element 51 connected to the ground metal plate 50 for providing proper grounding. In the fifth embodiment, the auxiliary grounding element 51 is an aluminum foil. In other applications, the auxiliary grounding element 51 can also be conductive foam or conductive glue.

Figure 9:
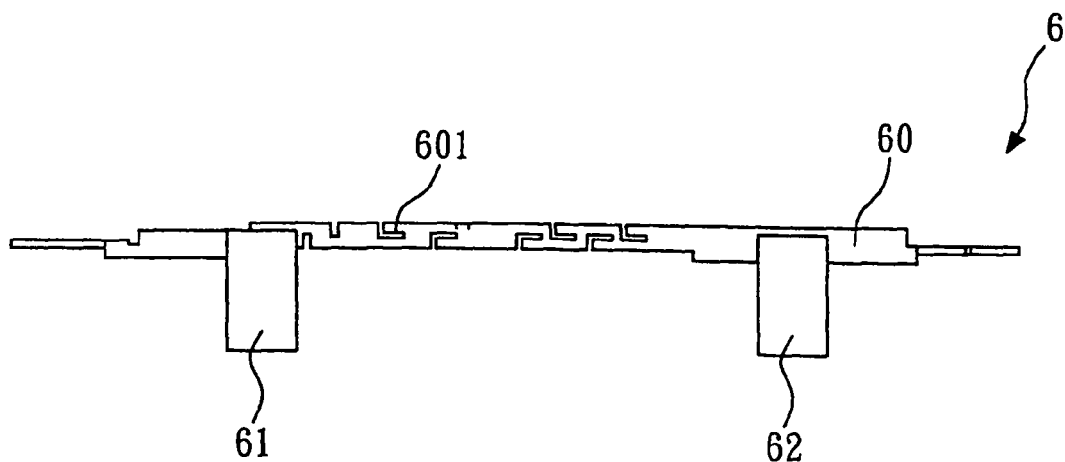
FIG. 9 is a schematic view of the integrated antenna according to the fourth embodiment of the present invention.

Referring to FIG. 9, a schematic view of the integrated antenna 6 for WWAN and WLAN according to the fourth embodiment of the present invention is shown. The integrated antenna 6 further comprises a plurality of auxiliary grounding elements 61, 62. The auxiliary grounding elements 61, 62 are connected to the ground metal plate 60 and separated for a distance. The above-mentioned auxiliary grounding elements 61, 62 can be bent and folded, thus saving space to satisfy the requirements of customers and provide the preferred grounding effect and radiation effect. The ground metal plate 60 of the integrated antenna 6 further has a plurality of slots 601 which can be formed on two sides of the ground metal plate 60. The slots 601 can be used to adjust the characteristics of the antenna.

The integrated antenna of the present invention can be used in WWAN and WLAN at the same time, and has a size within $100 \times 7 \times 5.8$ mm$^3$. Due to its small volume, the integrated antenna can be disposed in the wireless electronic device. In addition, the ground metal plate and the auxiliary grounding element of the antenna can be separately used to provide the grounding effect, and are selectively connected or not connected to the ground end of the wireless electronic device, and thus the integrated antenna of the present invention can be mounted on any place of the wireless electronic device, and also has stable electrical characteristics.

Figure 10:
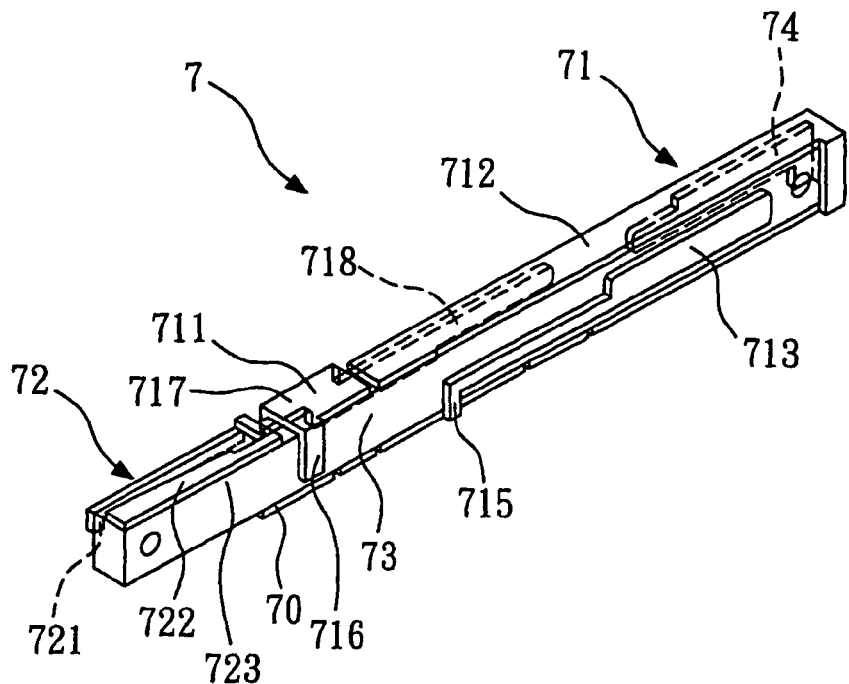
FIG. 10 is a stereogram of the integrated antenna according to the fifth embodiment of the present invention.
Figure 11:
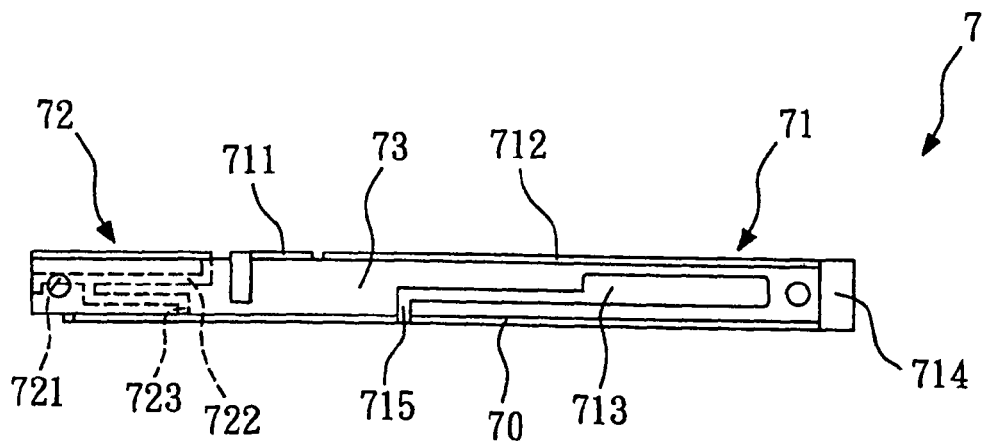
FIG. 11 is a front view of the integrated antenna according to the fifth embodiment of the present invention.

Referring to FIGS. 10 and 11, schematic views of the integrated antenna 7 for WWAN and WLAN according to the fifth embodiment of the present invention are shown. The integrated antenna 7 comprises a ground metal plate 70, a coupled WWAN antenna 71, a WLAN antenna 72, and a substrate 73. The arrangement of the ground metal plate 70, the coupled WWAN antenna 71, and the WLAN antenna 72 is the same as the arrangement of the ground metal plate 30, the coupled WWAN antenna 31 and the WLAN antenna 32 in the first embodiment, and the details will not be described herein again.

The ground metal plate 70 is disposed on a bottom surface of the substrate 73. The first connecting metal plate 714 and the second connecting metal plate 715 of the coupled WWAN antenna 71 extend from one side of the ground metal plate 70 and are disposed on a first side surface of the substrate 73. The first radiating metal plate 711 of the coupled WWAN antenna 71 comprises a first portion 716, a second portion 717, and a third portion 718. The first portion 716 is disposed on the first side surface, and the second portion 717 is disposed on a top surface of the substrate 73, in which the top surface is corresponding to the bottom surface. The third portion 718 is disposed on a second side surface of the substrate 73, in which the second side surface is corresponding to the first side surface. The second radiating metal plate 712 is disposed on the top surface. The third radiating metal plate 713 is disposed on the first side surface. The WLAN antenna 72 is disposed on the second side surface and the top surface, i.e., the third connecting metal plate 723 and the fourth radiating metal plate 721 are disposed on the second side surface, and the fifth radiating metal plate 722 extends from the second side surface to the top surface. The gain metal plate 74 is connected to the ground metal plate 70, and disposed on the same second side surface as the WLAN antenna 72. The substrate 70 can be a printed circuit board or a non-conductive solid material (such as plastic or wood). The substrate may also be used as a supporting element for supporting the first radiating metal plate 711.

The integrated antenna 7 of the fifth embodiment of the present invention utilizes the substrate 73 as the medium, which is different from the integrated antenna 3 of the first embodiment of the present invention using air as the medium. Therefore, the second embodiment, third embodiment and the fourth embodiment of the invention, can also utilize the substrate as the medium as in the fifth embodiment.

Figure 12:
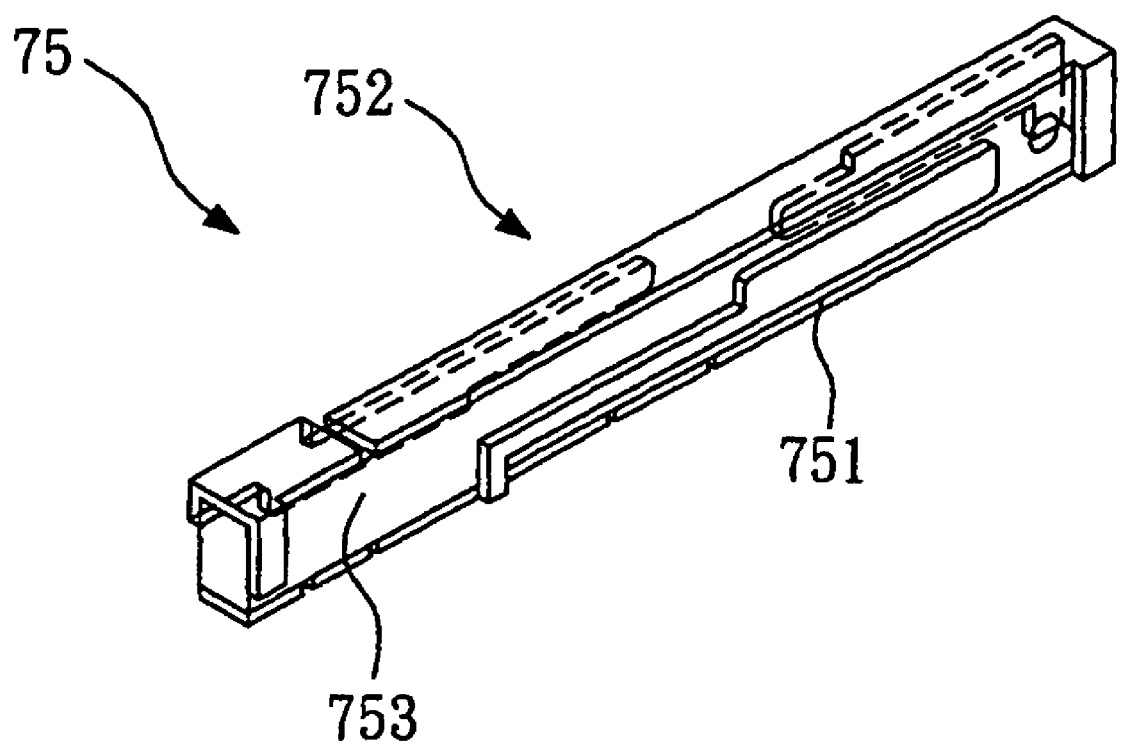
FIG. 12 is a WWAN antenna with a substrate according to the present invention.

The integrated antenna 7 for WWAN and WLAN in the fifth embodiment of the present invention can only be used in WWAN by deleting the WLAN antenna, thus becoming an antenna 75 for WWAN, as shown in FIG. 12. The antenna 75 comprises a ground metal plate 751, a coupled WWAN antenna 752, and a substrate 753, which have the same structure and arrangement as the above-mentioned ground metal plate 70, the coupled WWAN antenna 71, and the substrate 73 of the integrated antenna 7 in the fifth embodiment of FIG. 10, and the details will not be described herein again.

Figure 13:
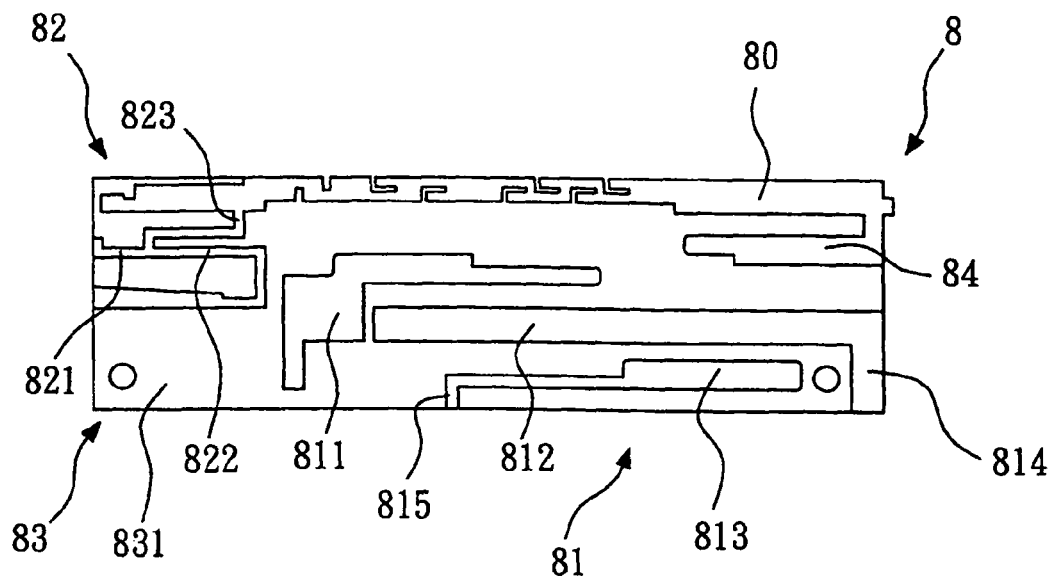
FIG. 13 is a top view of the integrated antenna according to the sixth embodiment of the present invention (before the flexible printed circuit board is bent)

Referring to FIG. 13, a schematic view of the integrated antenna 8 for WWAN and WLAN according to the sixth embodiment of the present invention is shown. The integrated antenna 8 comprises a ground metal plate 80, a coupled WWAN antenna 81, a WLAN antenna 82, and a flexible printed circuit board 83. The ground metal plate 80, the coupled WWAN antenna 81, and the WLAN antenna 82 are formed on a surface 831 of the flexible printed circuit board 83.

The first radiating metal plate 811 further comprises a first portion 816, a second portion 817, and a third portion 818. The ground metal plate 80 is disposed on a top of the flexible printed circuit board 83. A third connecting metal plate 823 extends downwards along a side of the ground metal plate 80. The WLAN antenna 82 is connected to the third connecting metal plate 823. A fourth connecting metal plate 841 extends downwards along the side of the ground metal plate 80. The gain metal plate 84 is connected to the fourth connecting metal plate 841 and is disposed in approximately parallel to the ground metal plate 80, and is separated for a distance.

A first connecting metal plate 814 and a second connecting metal plate 815 extend upwards from a bottom of the flexible printed circuit board 83, in which the bottom is corresponding to the top. The third radiating metal plate 813 is connected to the second connecting metal plate 815 and is disposed approximately parallel to the bottom, and separated for a distance. The second radiating metal plate 812 is connected to the first connecting metal plate 814, and is disposed approximately parallel with the third radiating metal plate 813, and is separated for a distance.

The first portion 816 of the first radiating metal plate 811 is disposed approximately at the same horizontal position as the third radiating metal plate 813. The second portion 817 of the first radiating metal plate 811 is disposed approximately at the same horizontal position as the second radiating metal plate 812 and is interposed between the second radiating metal plate 812 and the WLAN antenna 82. The third portion 818 of the first radiating metal plate 811 is disposed between the second radiating metal plate 812 and the ground metal plate 80 and is disposed approximately parallel with the second radiating metal plate 812, and is separated for a distance.

Figure 14:
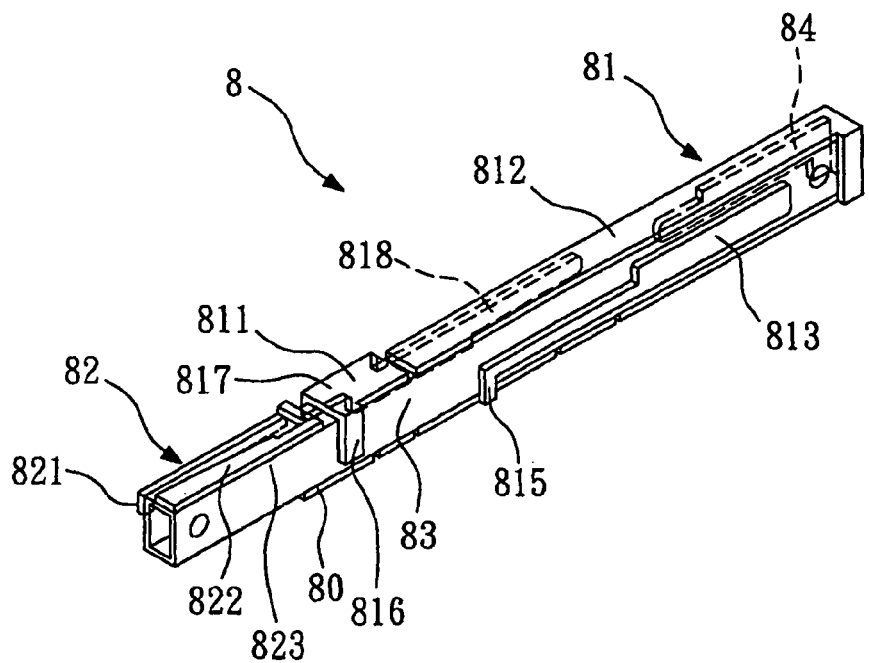
FIG. 14 is a stereogram of the integrated antenna according to the sixth embodiment of the present invention (after the flexible printed circuit board is bent)

Referring to FIGS. 13 and 14, the flexible printed circuit board 83 is bent to be a cuboid, such that the ground metal plate 80 is disposed on a bottom surface of the cuboid. The first connecting metal plate 814 and the second connecting metal plate 815 of the coupled WWAN antenna 81 are electrically connected to one side of the ground metal plate 80 and are disposed on a first side surface of the cuboid. The first portion 816 of the coupled WWAN antenna 81 is disposed on the first side surface. The second portion 817 of the coupled WWAN antenna 81 is disposed on a top surface of the cuboid, in which the top surface is corresponding to the bottom surface. The third portion 818 of the coupled WWAN antenna 81 is disposed on a second side surface of the cuboid, in which the second side surface is corresponding to the first side surface. The second radiating metal plate 812 is disposed on the top surface. The third radiating metal plate 813 is disposed on the first side surface. The WLAN antenna 82 is disposed on the second side surface and the top surface, i.e., the third connecting metal plate 823 and the fourth radiating metal plate 821 are disposed on the second side surface, and the fifth radiating metal plate 822 extends from the second side surface to the top surface. The gain metal plate 84 is connected to the ground metal plate 80 and is disposed on the same second side surface as the WLAN antenna 82. The flexible printed circuit board 83 can also be used as a supporting element for supporting the first radiating metal plate 811.

After the flexible printed circuit board 83 is bent to be a cuboid, it still has the air therein. Therefore, the integrated antenna 8 of the sixth embodiment of the present invention uses the flexible printed circuit board 83 and air as the medium, which is different from the integrated antenna 3 of the first embodiment of the present invention using air as the medium. In addition, the second embodiment, the third embodiment, and the fourth embodiment of the present invention, can also use the flexible printed circuit board and air as the medium as in the sixth embodiment.

The integrated antenna 8 of the sixth embodiment can be used for WWAN and WLAN. In addition, the flexible printed circuit board 83 can be bent to form a determined shape by utilizing the bendable characteristic of the flexible printed circuit board 83, so as to be disposed in the wireless electronic device, such that the installation is flexible.

Figure 15:
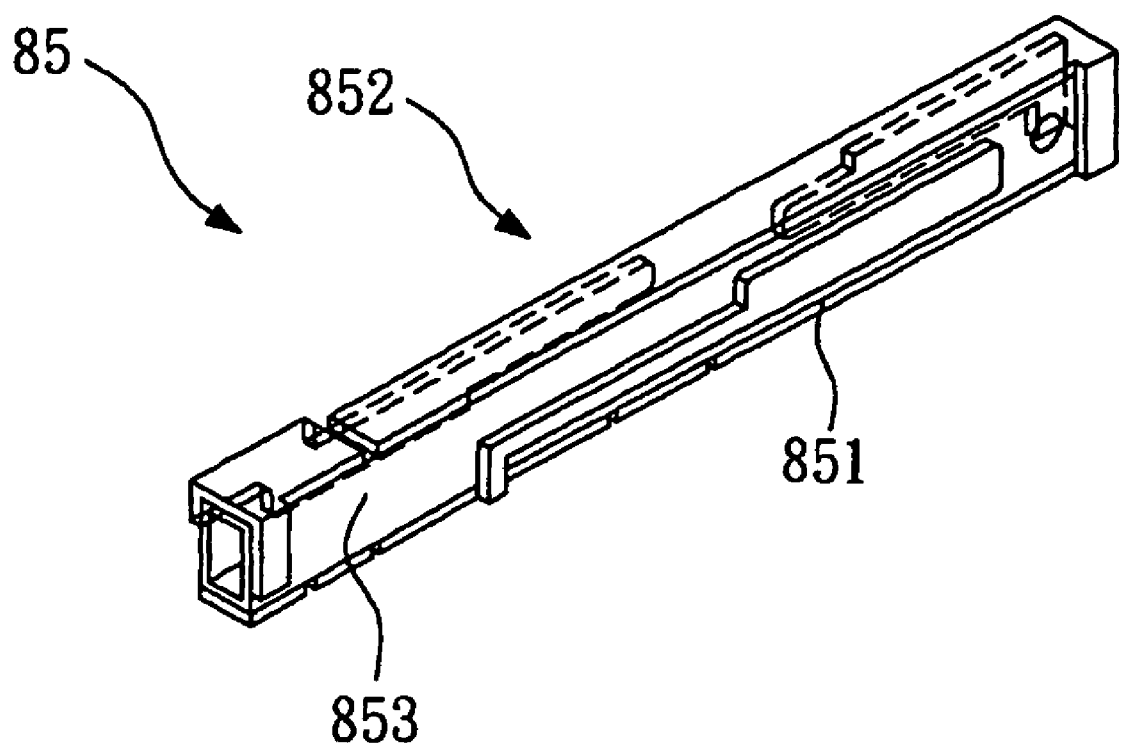
FIG. 15 is a WWAN antenna with a flexible printed circuit board according to the present invention (after the flexible printed circuit board is bent).

The integrated antenna 8 for WWAN and WLAN in the sixth embodiment of the present invention can only be used in WWAN by deleting the WLAN antenna, thus becoming an antenna 85 for WWAN, as shown in FIG. 15. The antenna 85 comprises a ground metal plate 851, a coupled WWAN antenna 852, and a flexible printed circuit board 853, which have the same structure and arrangement as the above-mentioned ground metal plate 80, the coupled WWAN antenna 81, and the flexible printed circuit board 83 of the integrated antenna 8 in the sixth embodiment of FIG. 14, and the details will not be described herein again.

While several embodiments of the present invention have been illustrated and described, various modifications and improvements can be made by those skilled in the art. The embodiment of the present invention is therefore described in an illustrative, but not restrictive, sense. It is intended that the present invention may not be limited to the particular forms as illustrated, and that all modifications which maintain the spirit and scope of the present invention are within the scope as defined in the appended claims.

What is claimed is:

1. An integrated antenna for WWAN and WLAN, comprising:
    a ground metal plate;
    a coupled WWAN antenna, the coupled WWAN antenna comprising a first radiating metal plate, a second radiating metal plate, and a third radiating metal plate, the first radiating metal plate being a separate metal plate and used for matching with the second radiating metal plate to induce a first resonance mode, the third radiating metal plate used to induce a second resonance mode;
    a WLAN antenna connected to the ground metal plate, the WLAN antenna comprising a fourth radiating metal plate and a fifth radiating metal plate for respectively inducing a third resonance mode and a fourth resonance mode;
    an auxiliary grounding element electrically connected to the ground metal plate; and
    at least one supporting element for supporting the first radiating metal plate.

2. The integrated antenna as claimed in claim 1, wherein the frequency of the first resonance mode is in a range of 824 MHz to 960 MHz, the frequency of the second resonance mode is in a range of 1575 MHz and 1710 MHz to 2170 MHz, the frequency of the third resonance mode is 5 GHz, and the frequency of the fourth resonance mode is 2.4 GHz.

3. The integrated antenna as claimed in claim 1, wherein the supporting element is an insulating element.

4. The integrated antenna as claimed in claim 1, wherein the coupled WWAN antenna further comprises a first connecting metal plate and a second connecting metal plate respectively used to connect the second radiating metal plate and the third radiating metal plate to the ground metal plate, in which the first radiating metal plate comprises a first portion, a second portion, and a third portion; and the WLAN antenna further comprises a third connecting metal plate used to connect the fourth radiating metal plate and the fifth radiating metal plate to the ground metal plate.

5. The integrated antenna as claimed in claim 4, wherein the fourth radiating metal plate and the fifth radiating metal plate extend in different opposite directions, so as to make the WLAN antenna is formed as an T shape; the WLAN antenna is disposed on a second side surface and a top surface of the integrated antenna; the third connecting metal plate and the fourth radiating metal plate are disposed on the second side surface; and the fifth radiating metal plate extends from the second side surface to the top surface.

6. The integrated antenna as claimed in claim 4, wherein the fourth radiating metal plate and the fifth radiating metal plate extend along the same direction and are disposed on the same side surface, so as to make the WLAN antenna is formed as an F shape.

7. The integrated antenna as claimed in claim 4, wherein the ground metal plate is disposed on a bottom surface of the integrated antenna; the first connecting metal plate and the second connecting metal plate of the coupled WWAN antenna extend from one side of the ground metal plate and are disposed on a first side surface of the integrated antenna; the first portion is disposed on the first side surface, the second portion is disposed on a top surface of the integrated antenna, the top surface is corresponding to the bottom surface, and the third portion is disposed on a second side surface of the integrated antenna, the second side surface is corresponding to the first side surface; and the second radiating metal plate is disposed on the top surface, and the third radiating metal plate is disposed on the first side surface.

8. The integrated antenna as claimed in claim 4, wherein the supporting element is a printed circuit board, and the ground metal plate is disposed on a bottom surface of the printed circuit board; the first connecting metal plate and the second connecting metal plate of the coupled WWAN antenna extend from one side of the ground metal plate and are disposed on a first side surface of the printed circuit board; the first portion is disposed on the first side surface, the second portion is disposed on a top surface of the printed circuit board, the top surface is corresponding to the bottom surface, and the third portion is disposed on a second side surface of the printed circuit board, the second side surface is corresponding to the first side surface; and the second radiating metal plate is disposed on the top surface, and the third radiating metal plate is disposed on the first side surface.

9. The integrated antenna as claimed in claim 4, wherein the supporting element is a non-conductive solid material, and the ground metal plate is disposed on a bottom surface of the non-conductive solid material; the first connecting metal plate and the second connecting metal plate of the coupled WWAN antenna extend from one side of the ground metal plate and are disposed on a first side surface of the non-conductive solid material; the first portion is disposed on the first side surface, the second portion is disposed on a top surface of the non-conductive solid material, the top surface is corresponding to the bottom surface, and the third portion is disposed on a second side surface of the non-conductive solid material, the second side surface is corresponding to the first side surface; and the second radiating metal plate is disposed on the top surface, and the third radiating metal plate is disposed on the first side surface.

10. The integrated antenna as claimed in claim 4, wherein the supporting element is a flexible printed circuit board, and the ground metal plate is disposed on a top of the flexible printed circuit board; the third connecting metal plate extends downwards along one side of the ground metal plate, and the WLAN antenna is connected to the third connecting metal plate; the first connecting metal plate and the second connecting metal plate extend upwards from a bottom of the flexible printed circuit board, the bottom is corresponding to the top; the third radiating metal plate is connected to the second connecting metal plate and is disposed parallel with the bottom and separated for a distance, and the second radiating metal plate is connected to the first connecting metal plate and is disposed parallel with the third radiating metal plate and separated for a distance; the first portion of the first radiating metal plate is disposed at the same horizontal position as the third radiating metal plate, the second portion of the first radiating metal plate is disposed at the same horizontal position as the second radiating metal plate and interposed between the second radiating metal plate and the WLAN antenna, and the third portion of the first radiating metal plate is disposed between the second radiating metal plate and the ground metal plate and parallel with the second radiating metal plate and separated for a distance.

11. The integrated antenna as claimed in claim 10, wherein the flexible printed circuit board is bent to be a cuboid, and the ground metal plate is disposed on a bottom surface of the cuboid; the first connecting metal plate and the second connecting metal plate of the coupled WWAN antenna are electrically connected to one side of the ground metal plate and disposed on a first side surface of the cuboid; the first portion is disposed on the first side surface, the second portion is disposed on a top surface of the cuboid, the top surface is corresponding to the bottom surface, and the third portion is disposed on a second side surface of the cuboid, the second side surface is corresponding to the first side surface; and the second radiating metal plate is disposed on the top surface, and the third radiating metal plate is disposed on the first side surface.

12. The integrated antenna as claimed in claim 1, wherein the distance between the first radiating metal plate and the second radiating metal plate is between 0.5 mm and 1.5 mm.

13. The integrated antenna as claimed in claim 12, wherein the distance between the first radiating metal plate and the second radiating metal plate is between 0.5 mm and 1.0 mm, and the induced frequency of the first resonance mode is in a range of 824 MHz to 894 MHz.

14. The integrated antenna as claimed in claim 12, wherein the distance between the first radiating metal plate and the second radiating metal plate is between 1.0 mm and 1.5 mm, and the induced frequency of the first resonance mode is in a range of 880 MHz to 960 MHz.

15. The integrated antenna as claimed in claim 1, further comprising a gain metal plate connected to the ground metal plate for increasing gain.

16. The integrated antenna as claimed in claim 1, wherein the auxiliary grounding element is aluminum foil.

17. The integrated antenna as claimed in claim 1, wherein the auxiliary grounding element is conductive glue.

18. The integrated antenna as claimed in claim 1, wherein the auxiliary grounding element is conductive foam.

19. The integrated antenna as claimed in claim 1, wherein the ground metal plate has at least one slot.

20. An antenna for WWAN, comprising:
a ground metal plate;
a coupled WWAN antenna, the coupled WWAN antenna comprising a first radiating metal plate, a second radiating metal plate, and a third radiating metal plate, the first radiating metal plate being a separate metal plate and used for matching with the second radiating metal plate to induce a first resonance mode, the third radiating metal plate used to induce a second resonance mode;
an auxiliary grounding element electrically connected to the ground metal plate; and
at least one supporting element for supporting the first radiating metal plate,
wherein the coupled WWAN antenna further comprises a first connecting metal plate and a second connecting metal plate respectively used to connect the second radiating metal plate and the third radiating metal plate to the ground metal plate; the first radiating metal plate comprises a first portion, a second portion, and a third portion.

21. The antenna as claimed in claim 20, wherein the frequency of the first resonance mode is in a range of 824 MHz to 960 MHz, and the frequency of the second resonance mode is in a range of 1575 MHz and 1710 MHz to 2170 MHz.

22. The antenna as claimed in claim 20, wherein the supporting element is an insulating element.

23. The antenna as claimed in claim 20, wherein the ground metal plate is disposed on a bottom surface of the antenna; the first connecting metal plate and the second connecting metal plate of the coupled WWAN antenna extend from one side of the ground metal plate and are disposed on a first side surface of the antenna; the first portion is disposed on the first side surface, the second portion is disposed on a top surface of the antenna, the top surface is corresponding to the bottom surface, and the third portion is disposed on a second side surface of the antenna, the second side surface is corresponding to the first side surface; the second radiating metal plate is disposed on the top surface, and the third radiating metal plate is disposed on the first side surface.

24. The antenna as claimed in claim 20, wherein the supporting element is a printed circuit board, and the ground metal plate is disposed on a bottom surface of the printed circuit board; the first connecting metal plate and the second connecting metal plate of the coupled WWAN antenna extend from one side of the ground metal plate and are disposed on a first side surface of the printed circuit board; the first portion is disposed on the first side surface, the second portion is disposed on a top surface of the printed circuit board, the top surface is corresponding to the bottom surface, and the third portion is disposed on a second side surface of the printed circuit board, the second side surface is corresponding to the first side surface; and the second radiating metal plate is disposed on the top surface, and the third radiating metal plate is disposed on the first side surface.

25. The antenna as claimed in claim 20, wherein the supporting element is a non-conductive solid material, and the ground metal plate is disposed on a bottom surface of the non-conductive solid material; the first connecting metal plate and the second connecting metal plate of the coupled WWAN antenna extend from one side of the ground metal plate and are disposed on a first side surface of the non-conductive solid material; the first portion is disposed on the first side surface, the second portion is disposed on a top surface of the non-conductive solid material, the top surface is corresponding to the bottom surface, and the third portion is disposed on a second side surface of the non-conductive solid material, the second side surface is corresponding to the first side surface; and the second radiating metal plate is disposed on the top surface, and the third radiating metal plate is disposed on the first side surface.

26. The antenna as claimed in claim 20, wherein the supporting element is a flexible printed circuit board, and the ground metal plate is disposed on a top of the flexible printed circuit board; the first connecting metal plate and the second connecting metal plate extend upwards from a bottom of the flexible printed circuit board, the bottom is corresponding to the top; the third radiating metal plate is connected to the second connecting metal plate and is disposed parallel with the bottom and separated for a distance; the second radiating metal plate is connected to the first connecting metal plate and is disposed parallel with the third radiating metal plate and separated for a distance; the first portion of the first radiating metal plate is disposed at the same horizontal position as the third radiating metal plate, the second portion of the first radiating metal plate is disposed at the same horizontal position as the second radiating metal plate, and the third portion of the first radiating metal plate is disposed between the second radiating metal plate and the ground metal plate and is disposed parallel with the second radiating metal plate and separated for a distance.

27. The antenna as claimed in claim 26, wherein the flexible printed circuit board is bent to be a cuboid, and the ground metal plate is disposed on a bottom surface of the cuboid; the first connecting metal plate and the second connecting metal plate of the coupled WWAN antenna are electrically connected to one side of the ground metal plate and are disposed on a first side surface of the cuboid; the first portion of the coupled WWAN antenna is disposed on the first side surface, the second portion of the coupled WWAN antenna is disposed on a top surface of the cuboid, the top surface is corresponding to the bottom surface, and the third portion of the coupled WWAN antenna is disposed on a second side surface of the cuboid, the second side surface is corresponding to the first side surface; and the second radiating metal plate is disposed on the top surface, and the third radiating metal plate is disposed on the first side surface.

28. The antenna as claimed in claim 20, wherein the distance between the first radiating metal plate and the second radiating metal plate is between 0.5 mm and 1.5 mm.

29. The antenna as claimed in claim 28, wherein the distance between the first radiating metal plate and the second radiating metal plate is 0.5 mm to 1.0 mm, and the induced frequency of the first resonance mode is in a range of 824 MHz to 894 MHz.

30. The antenna as claimed in claim 28, wherein the distance between the first radiating metal plate and the second radiating metal plate is between 1.0 mm and 1.5 mm, and the induced frequency of the first resonance mode is in a range of 880 MHz to 960 MHz.

31. The antenna as claimed in claim 20, further comprising a gain metal plate connected to the ground metal plate for increasing gain.

32. The antenna as claimed in claim 20, wherein the auxiliary grounding element is aluminum foil.

33. The antenna as claimed in claim 20, wherein the auxiliary grounding element is conductive glue.

34. The antenna as claimed in claim 20, wherein the auxiliary grounding element is conductive foam.

35. The antenna as claimed in claim 20, wherein the ground metal plate has at least one slot.

* * * * *